(12) United States Patent  (10) Patent No.: US 8,822,024 B2
Luchsinger et al.  (45) Date of Patent: Sep. 2, 2014

(54) METHOD OF PRODUCING A SELF-HEALING MEMBRANE

(75) Inventors: Rolf Luchsinger, Uster (CH); Thomas Speck, Schallstadt (DE); Olga Speck, Schallstadt (DE)

(73) Assignee: Prospective Concepts AG, Glattbrugg (CH)

( * ) Notice: Subject to any disclaimer, the term of this patent is extended or adjusted under 35 U.S.C. 154(b) by 1830 days.

(21) Appl. No.: 11/922,859

(22) PCT Filed: Jul. 12, 2006

(86) PCT No.: PCT/CH2006/000366
§ 371 (c)(1),
(2), (4) Date: Feb. 29, 2008

(87) PCT Pub. No.: WO2007/009280
PCT Pub. Date: Jan. 25, 2007

(65) Prior Publication Data
US 2009/0035551 A1  Feb. 5, 2009

(30) Foreign Application Priority Data

Jul. 15, 2005  (CH) ...................................... 1179/05

(51) Int. Cl.
*B32B 3/00*  (2006.01)
*B29C 73/18*  (2006.01)
*B29C 73/22*  (2006.01)

(52) U.S. Cl.
USPC ........................... 428/316.6; 156/77; 427/243

(58) Field of Classification Search
USPC ........................... 427/156; 156/77; 428/316.6
See application file for complete search history.

(56) References Cited

U.S. PATENT DOCUMENTS

| 1,959,460 | A | 5/1934 | Crossan |
| 3,444,918 | A | 5/1969 | Goggins |
| 5,350,481 | A | 9/1994 | Shepard et al. |

FOREIGN PATENT DOCUMENTS

| EP | 0370039 | 5/1990 |
| EP | 0764875 | 3/1997 |
| EP | 1210489 | 6/2002 |
| EP | 1239756 | 9/2002 |
| EP | 1554158 | 7/2005 |
| WO | WO-2004/007608 | 1/2004 |
| WO | WO-2004/009400 | 1/2004 |
| WO | WO-2005/007991 | 1/2005 |

OTHER PUBLICATIONS

Boone, John ., "International Search Report" for PCT/CH2006/000366 as mailed Nov. 15, 2006, (4 pages).

*Primary Examiner* — Lynda Salvatore
(74) *Attorney, Agent, or Firm* — Winstead PC

(57) ABSTRACT

The invention relates to a membrane that heals on its own after being damaged mechanically as well as a method for producing said membrane which is used for pneumatic structures featuring an internal operating pressure of 10 mbar to 500 mbar. The inventive membrane is provided with a plastic layer on the pressure side, said plastic layer being interspersed with blisters that have a diameter ranging from 10μ to 200μ.

15 Claims, 4 Drawing Sheets

METHOD OF PRODUCING A SELF-HEALING MEMBRANE

BACKGROUND OF THE INVENTION

1. Technical Field

The present invention relates to a method for producing a membrane which, following mechanical injury in the sense of a puncture or a bullet hole or penetration wound with a small-caliber weapon, is capable of closing this injury without external intervention.

2. History of the Related Art

The present invention is concerned with pneumatic structures such as have been known, for example, from the European Patent Specifications EP 1 239 756, EP 1 210 489, the European Patent Applications EP 03 700 039 and EP 03 764 875 and the international publication WO 2005/007991.

EP 1 239 756 discloses a pneumatic mattress or bench seat which requires no horizontal support as underlay. It can quickly be made ready for use and can be stowed away again with little space requirement. The arrangement of the supporting chambers can be configured in such a manner that the mattress itself is configured in the manner of a supporting structure.

EP 1 210 489 discloses a pneumatic structural element in the manner of an inflatable tubular hollow body which can absorb without buckling tensile and thrust forces which may arise. The structural elements can easily be joined together to form more complex components such as roofs or bridges, which may be erected very rapidly.

EP 1 554 158 (EP 1 210 489) discloses an adaptive pneumatic seat and backrest for vehicles and airplanes which, despite the given basic structure of the air chambers, offers high seat comfort corresponding to conventional foam cushions and brings a discernible saving in weight compared with these.

WO 2004/009400 (EP 03 764 875) discloses an adaptive pneumatic seat and backrests for vehicles and airplanes which, despite the given basic structure of the air chambers, offers high seat comfort corresponding to conventional foam cushions and brings a discernible saving in weight compared with these and in addition, can be simply designed onto existing seat shell structures.

WO 2005/007991 discloses a pneumatic support. The structural element can easily be joined together to form more complex components such as roofs or bridges which may be erected very rapidly. In addition, the structural element can easily be joined to conventional existing building constructions.

Among other things, such pneumatic structures have in common that they weigh comparatively little, i.e. they are easily transportable since their membrane takes up little space in the deflated state and can be stored and transported in a space-saving manner.

These pneumatic structures comprise on the one hand large-area structures having areas of several hundred to several thousand square meters with small excess pressures of the order of magnitude of 10 to 500 mbar, on the other hand small-volume and small-area structures having excess pressures of 50-200 mbar, as in the case of pneumatic seats for example.

In all these cases the escape of compressed gas, usually air, should be avoided in order to maintain said internal operating pressure at least at the necessary minimum.

SUMMARY OF THE INVENTION

The object of the present invention is to provide a method whereby a membrane used as an envelope in such said pneumatic structures can be prepared and processed in such a manner that a hole of said type in this membrane closes without intervention.

BRIEF DESCRIPTION OF THE DRAWINGS

A more complete understanding of the self-healing membrane of the present invention may be obtained by reference to the following Detailed Description, when taken in conjunction with the accompanying drawings, wherein.

DETAILED DESCRIPTION OF THE INVENTION

Figure 1:
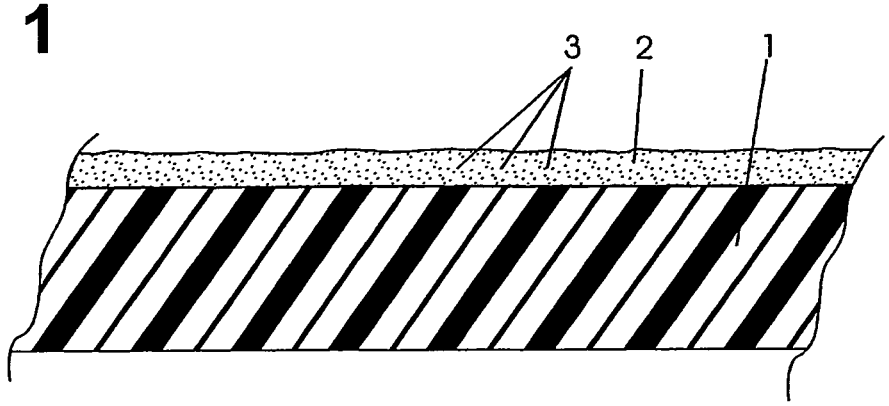
FIG. 1 illustrates a cross-section through a membrane produced according to the invention.

Reference is now made in detail to exemplary embodiments of the present invention illustrated in the accompanying drawings. Wherever possible, the same reference numerals are used throughout the drawings to refer to the same or similar parts.

FIG. 1 shows a membrane as an envelope of a pneumatic structure, the airtight membrane is designated by the reference numeral 1. The membrane 1 can be, for example, fabric made of polyester, nylon, fiberglass, aramides coated with a plastic such as PVC, PU, silicone or Teflon® but also flexible films made of such materials if the tensile stresses which occur are within permissible material properties.

A thin layer 2 of a plastic containing a plurality of small gas bubbles 3 is applied to the inside of this membrane 1 by means of one of the known techniques, i.e., for example, by wiping, rolling or spraying. Polyurethane, for example, is used as the plastic here.

For example, PVC-coated polyester fabric from Duraskin® (Type III, Verseldag, Krefeld) was coated with different commercially available closed-pore polyurethane foams according to the manufacturer's instructions. The two-component polyurethane foam Polyfoam F5 (Polyconform GmbH) proved to be particularly suitable here.

The aforementioned gas bubbles 3 located in the plastic of the layer 2 can either be incorporated therein by a rapid mixing process of the plastic. However, they can also be formed by the polymerization process and then left in the plastic by omitting a vacuum treatment. Gas bubbles in the range of 10μ-200μ have proved successful for the desired self-healing process of an injury to the membrane 1. (An arrangement comprising a stereomicroscope (Olympus, SZX9) and connected digital camera (Olympus DP12, Japan) was advantageous for studying the membrane 1 coated by the layer 2).

The membrane 1 was then polymerized at elevated pressure. However, the polymerization parameters such as pressure and temperature can vary, being specific to the plastic. The elevated pressure, typically 2 bar, is important.

An excess pressure over 5 bar leads to a deterioration in the self-healing or repair capability compared with an excess pressure of 2 bar, which lies in the range which is already attainable during polymerization without excess pressure. As has been mentioned, the best self-healing results were achieved during polymerization at an excess pressure in the range of 2 bar. Polymerization in an excess pressure range of 2 to 3 bar also yielded good results. Polymerization in the excess pressure range of 0.5 to 4 bar still yields significantly better results compared with polymerization without excess pressure.

The improved reaction properties can be attributed to the elevated internal pressure of the foam cells or bubbles (3) and also to conformational or structural changes inside the foam which have a positive influence on the repair, i.e. sealing, behavior merely as a result of a different arrangement of the material.

The repair behavior could also be further improved by determining the amount of plastic to be polymerized applied per unit area; better results in the self-healing or repair behavior were achieved with an amount of coating in the range of 1 to 2 g for an area of about 20 $cm^2$ (circular sample having a diameter of 5 cm) as compared with amounts of coating outside this range. A coating amount of 1.6 g proved to be particularly advantageous. This corresponds to a quantity per 100 $cm^2$ of 5 to 10 g or an optimal quantity of 8 g of coating material.

Finally, it has also proved favorable to store the coated membrane after polymerization or protect it from mechanical stressing, i.e. to delay the time before the possible first injury. An improvement in the repair capability of the coated membrane was already observed after a week, with eight weeks having proved to be particularly advantageous.

Figure 2:
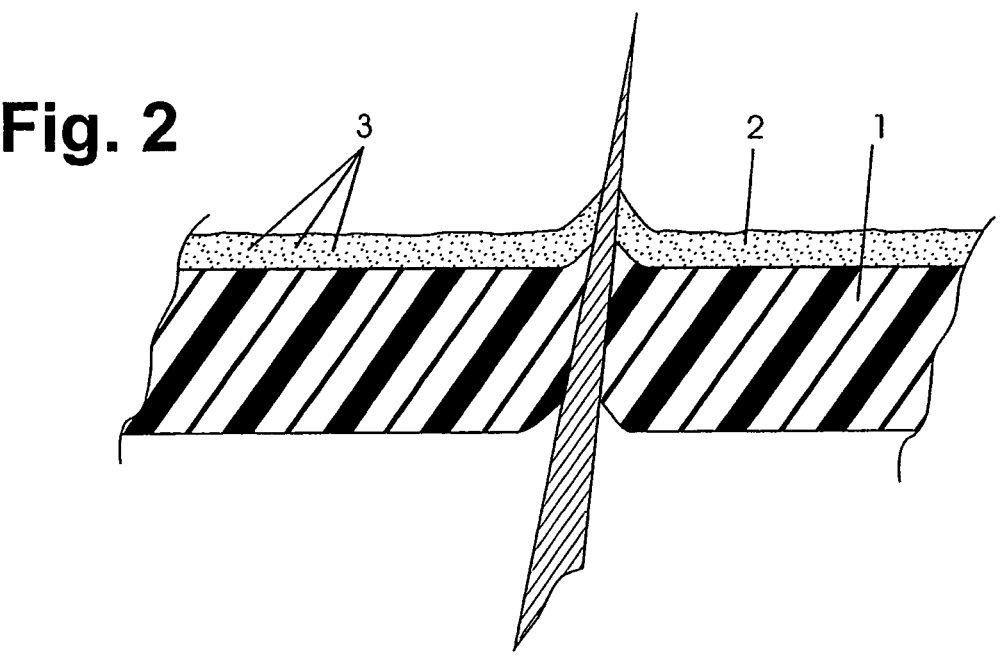
FIG. 2 illustrates a first type of injury.
Figure 3:
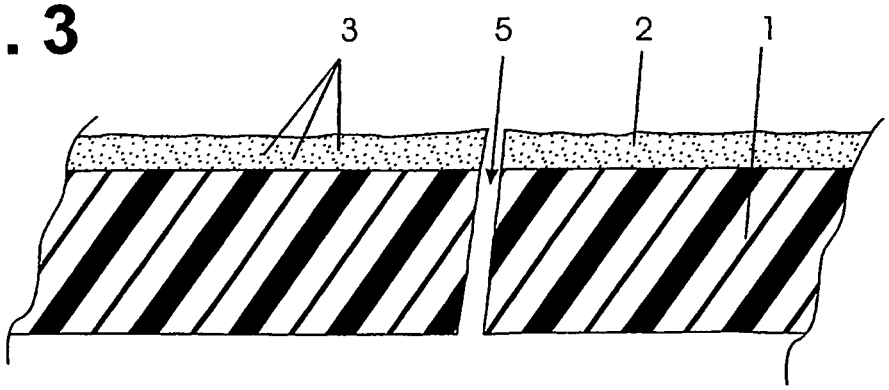
FIG. 3 illustrates FIG. 2 after removal of the injurious object.

If the membrane 1 is injured by piercing with a pointed object, a hole thus formed will close partly by itself as a result of the elastic properties of the membrane 1 as shown in FIG. 2. A fissure 5 as shown in FIG. 3 remains.

Figure 4:
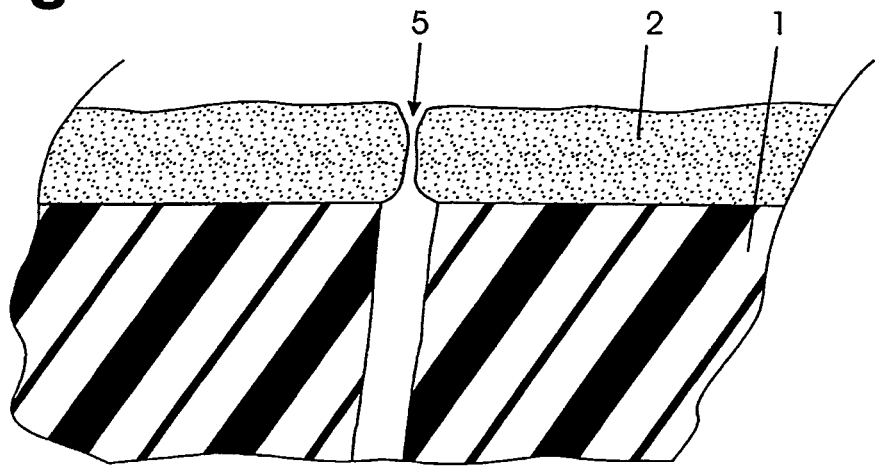
FIG. 4 illustrates the first type of injury on an enlarged scale.

FIG. 4 shows a section of the uppermost part of the fissure 5. Under the influence of the internal pressure of the gas bubbles or an internal stress of the layer 2, a part of the layer 2 is pushed into the fissure 5 and is partially pressed therein by the escaping air; a process which can take seconds to minutes. The cross-section of the hole is thereby reduced and the leakage flow severely suppressed. Since the internal pressure can usually be maintained by external means such as compressors or, at low internal pressures of pneumatic structures, by fans, and in addition, this internal pressure is usually permanently monitored, there is sufficient time for an intervention in the sense of a repair to the envelope of the pneumatic structure.

For fissures 5 of small diameter, complete closure can occur merely as a result of the subsequent pushing of the layer 2.

In the case of larger holes 4 or holes caused by blunt objects or by projectiles from firearms, however, the self-healing effect described with reference to FIGS. 2 to 4 does not result in complete closure of the hole 4. With such an injury, the layer 2 is torn along a larger rim of a hole. In order to make self-healing possible even in said cases, pre-polymers in a suitable form, for example, are provided which polymerize on contact with air and the moisture contained therein. Typically, on contact with the moisture in the air, such polymers form bubbles which are drawn into the hole 4 and completely cure there. Moreover, since the structural forces are absorbed by the membrane, a hole in the membrane is not a weakening if the force flow is interrupted as a result of the lower strength of its filling. Alternatively, two-component plastics can also be used in a suitable form instead of pre-polymers.

Figure 5:
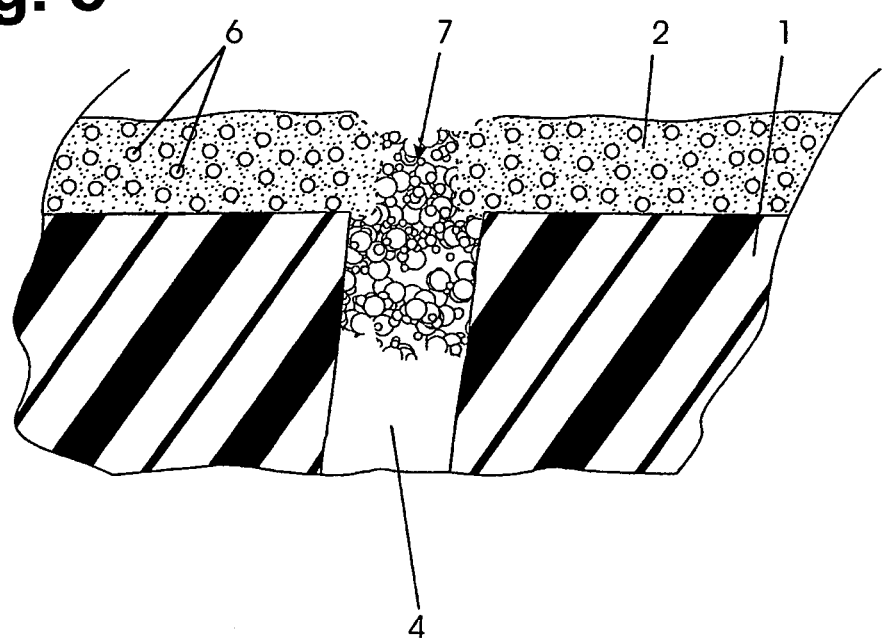
FIG. 5 illustrates a second type of injury during the self-healing process.

FIG. 5 shows a first exemplary embodiment of a second step of this production method according to the invention. Here, a plurality of microcapsules 6 are mixed into the material of the layer 2. Such microcapsules typically having a diameter of about 100μ, contain, for example, a monomer, others contain an accelerator and/or a catalyst for effecting the polymerization of the monomer. The monomer can also contain a solvent in which a suitable gas is dissolved under pressure. Such techniques are known from plastics technology. In addition, such microcapsules 6 can also contain a pre-polymer which preferably contains a solvent and a propellant gas dissolved therein under pressure. If such microcapsules 6 are torn by an injury, a puncture or a penetration wound, the contents of a plurality of microcapsules 6 escape at the rim of the hole, forming a foam 7 which now hardens under the influence of the catalysts or the air humidity and permanently closes the hole 4. In the case of textile-reinforced membranes 1, adhesion to the walls of the hole 4 also occurs if the plastic contained in the microcapsules 6 does not bind sealingly or only poorly binds to that of the layer 2 or that of the membrane 1 since a plurality of textile fibers are exposed and the plastic emerging from the microcapsules can adhere to their open ends. Otherwise, the plastic of the membrane coating must be matched to that of the layer 2. Naturally and optimally, said plastics are matched to one another, and the sealing can thus be optimized.

Figure 6:
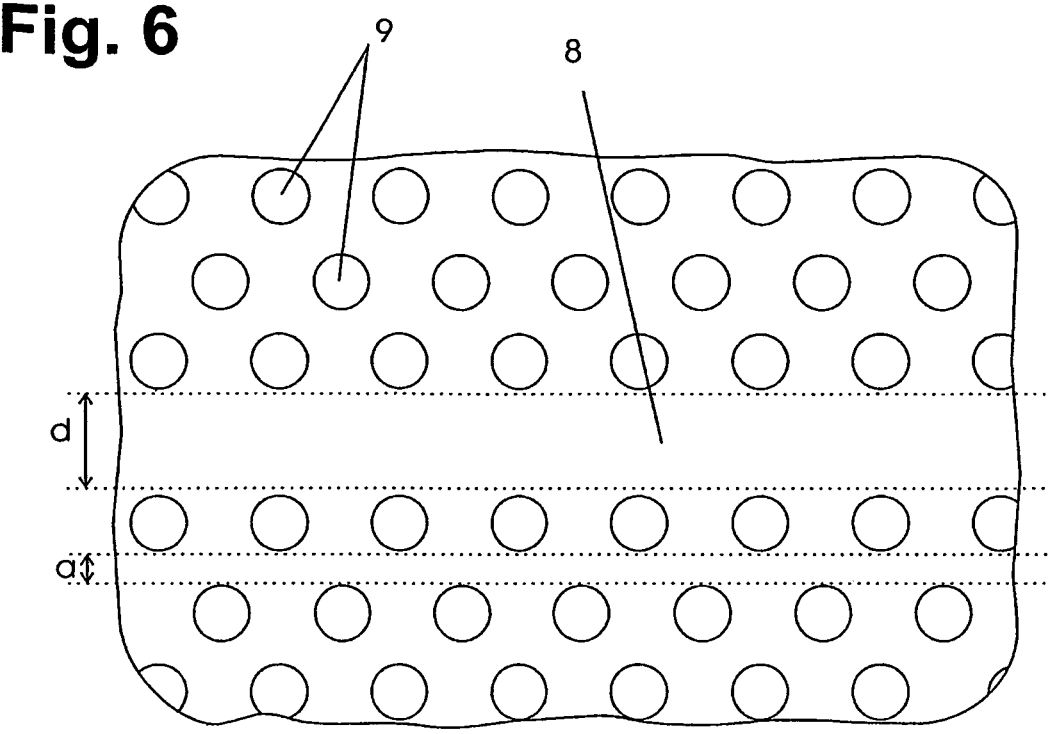
FIG. 6 illustrates a plan view of a film to be applied to the layer.

FIG. 6 shows a plan view of a blister film 8 which either contains a monomer or, in a selected distribution, a monomer and a suitable polymerization partner or a moisture-curing pre-polymer with accelerator, in a plurality of blisters 9. The size of the blisters 9 can be selected and adapted in a broad framework so that, in conjunction with the distances a between the blisters 9, this ensures that in the event of injuries to the membrane which go beyond the self-healing capability of the layer 7, a plurality of such blisters 6 are torn. A foam then forms, as described for FIG. 5, which enters into the injury and polymerizes there. A distance d>a is provided between the rows of blisters 9 at said distances a, which allows the blister film to be fastened to the layer 2 by gluing or welding.

Naturally, the blisters 9 can be produced in any suitable shape and the surface coverage thereby optimized. The size of the blisters 9 can also be varied widely.

Figure 7:
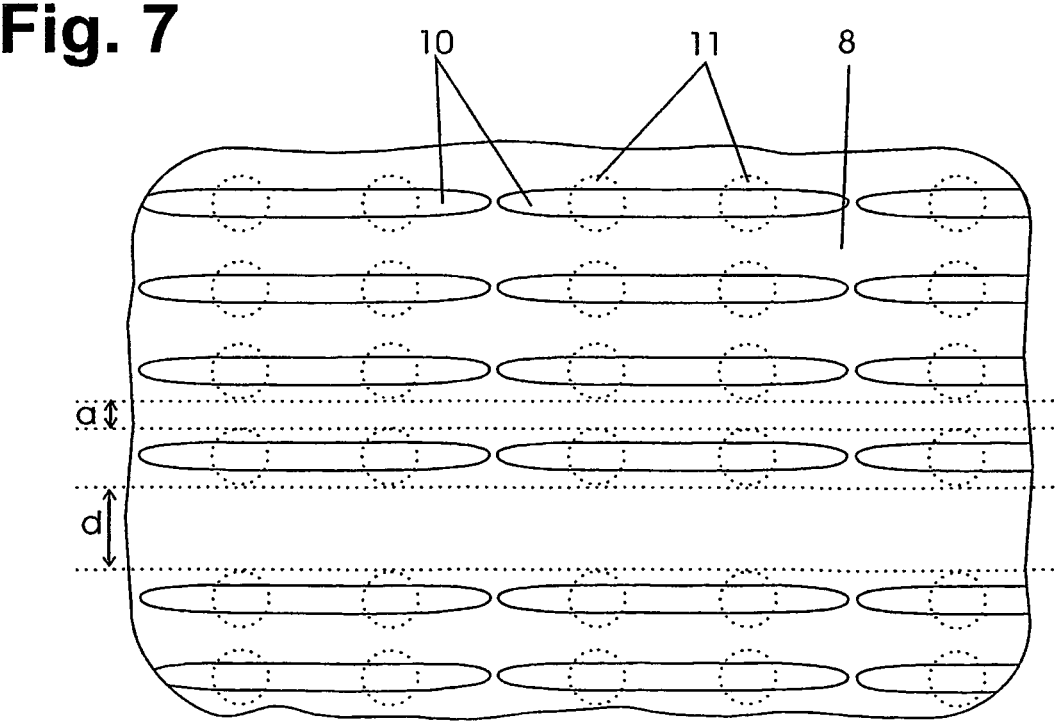
FIG. 7 illustrates, in plain view, a variant of the process step of FIG. 6.

FIG. 7 shows a variant of the exemplary embodiment from, also in plan view. Here, elongated blisters 10 are provided, for example, filled with a monomer. In a second position, on the back of the blister film 8, other blisters 11 are arranged coincidentally (shown with dotted rims). Naturally, the shapes can also be selected differently here and the respective size ratios of the blisters 10, 122 can be provided differently. It corresponds to the inventive idea to arrange the blisters 10, 11 such that if a blister 10 is injured, a blister 11 is also injured so that a polymerizing plastic is formed and can penetrate into a hole 4 and seal this. In this exemplary embodiment a strip d>a can also be provided to allow the blister film 8 to be glued or welded to the layer 2, without injuring the blisters 10, 11.

Figure 8:
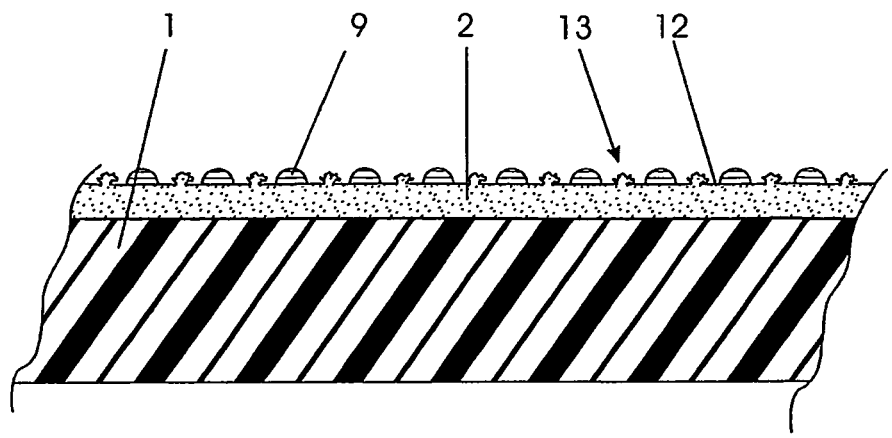
FIG. 8 illustrates a cross-section of a second variant for the process step according to FIG. 6.

An alternative to the method examples in FIGS. 6 and 7 is shown in FIG. 8. Before the layer 2 is pressure-polymerised, a blister film 12 is applied thereto which, compared to the blister films 8 already described, additionally has a perforation extending into the surface, consisting of a plurality of small holes 13 which preferably have a diameter of 0.1 to 1.0 mm. The blisters 9 again, for example, contain two components of a suitable plastic.

After applying the blister film 12, the polymerisation now takes place under pressure, as described for FIG. 1. The blister film 12 is fixed on the layer 2 by partial penetration of the layer 2 into the perforation.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications, and substitutions without departing from the spirit and scope of the invention as set forth in the foregoing specification and following claims.

The invention claimed is:

1. A method of producing a self-healing membrane of a type for compressed-gastight sealing of a pressurized pneumatic structure having an excess pressure in an order of 10 to 500 mbar, the method comprising:
   applying a layer of a polymerizable plastic to an interior side of an envelope, the envelope comprising a gastight membrane, and containing a compressed gas;
   polymerizing the layer of polymerizable plastic under pressure, the polymerizing forming a plurality of air or gas bubbles in the layer of polymerizable plastic; and
   wherein air or gas bubbles, suspended in the layer of polymerizable plastic, and formed by the polymerizing step, are not removed by a vacuum treatment.

2. The method according to claim 1, wherein the self-healing membrane is reinforced with a textile fabric and is made gastight by means of a plastic coating.

3. The method according to claim 1, wherein a plurality of microcapsules are added to the layer of polymerizable plastic before the step of polymerizing.

4. The method according to claim 3, wherein the plurality of microcapsules comprise a moisture-curing pre-polymer.

5. The method according to claim 3, further comprising:
   a first plurality of microcapsules comprising a monomer;
   a second plurality of microcapsules comprising an accelerator and/or a catalyst; and
   wherein a ratio of the first plurality of microcapsules to the second plurality of microcapsules are disposed with the plastic to be polymerized.

6. The method according to claim 1, wherein prior to the step of polymerizing, a blister film is applied to the layer of polymerizable plastic, said blister film comprising:
   a plurality of small holes disposed on a side facing away from the layer of polymerizable plastic;
   a plurality of blisters, comprising:
      a first number of blisters comprising a monomer;
      a second number of blisters comprising an accelerator and/or a catalyst; and
      wherein a ratio of the first number of blisters to the second number of blisters are disposed with the plastic to be polymerized.

7. The method according to claim 3, wherein a blister film, comprising a plurality of blisters, is glued or welded to the layer of polymerizable plastic, the blisters having a uniform distance from one another.

8. The method according to claim 7, wherein the plurality of blisters contain a moisture-curing pre-polymer.

9. The method according to claim 7, wherein the blister film comprises:
   a first plurality of blisters containing a first component of a two-component plastic;
   a second plurality of blisters containing a second component of the two-component plastic; and
   wherein the first plurality of blisters and the second plurality of blisters are arranged alternately on the blister film.

10. The method according to claim 7, wherein:
    the blister film comprises a first plurality of blisters and a second plurality of blisters disposed on opposite sides of a central film;
    the first plurality of blisters comprise a monomer, the second plurality of blisters comprise a second component of a two-component plastic; and
    the first and second plurality of blisters are arranged at least partly coincidentally.

11. The method according to claim 10, wherein the first plurality of blisters are elongated and the second plurality of blisters are generally circular.

12. The method according to claim 7, wherein, the plurality of blisters are arranged in rows, the rows having variable spacing with respect to each other.

13. The method according to claim 1, wherein the step of polymerizing takes place at an excess pressure of approximately 0.4 to approximately 4 bar.

14. The method according to claim 1, wherein the layer of polymerizable plastic is applied to the membrane in an amount of approximately 5 to approximately 10 g per 100 $cm^2$ of membrane surface.

15. The method according to claim 1, further comprising the step of storing a coated membrane over a period of approximately 1 to approximately 8 weeks.

\* \* \* \* \*